(12) United States Patent
Subbiah et al.

(10) Patent No.: US 11,734,223 B2
(45) Date of Patent: Aug. 22, 2023

(54) NVME-OVER-FABRICS GATEWAY SYSTEM

(71) Applicant: Dell Products L.P., Round Rock, TX (US)

(72) Inventors: Ramesh Kumar Subbiah, Chennai (IN); Vibin Varghese, Chennai (IN)

(73) Assignee: Dell Products L.P., Round Rock, TX (US)

( * ) Notice: Subject to any disclaimer, the term of this patent is extended or adjusted under 35 U.S.C. 154(b) by 197 days.

(21) Appl. No.: 17/023,700

(22) Filed: Sep. 17, 2020

(65) Prior Publication Data

US 2022/0083496 A1  Mar. 17, 2022

(51) Int. Cl.

| | |
|---|---|
| *H04L 61/59* | (2022.01) |
| *G06F 15/173* | (2006.01) |
| *G06F 13/16* | (2006.01) |
| *H04L 67/2871* | (2022.01) |
| *H04L 69/08* | (2022.01) |
| *H04L 67/1097* | (2022.01) |
| *H04L 49/356* | (2022.01) |
| *H04L 69/326* | (2022.01) |

(52) U.S. Cl.
CPC .... *G06F 15/17331* (2013.01); *G06F 13/1668* (2013.01); *H04L 49/357* (2013.01); *H04L 61/59* (2022.05); *H04L 67/1097* (2013.01); *H04L 67/2871* (2013.01); *H04L 69/08* (2013.01); *H04L 69/326* (2013.01)

(58) Field of Classification Search
CPC .......... G06F 15/17331; G06F 13/1668; H04L 49/357; H04L 49/356; H04L 61/6013; H04L 67/1097; H04L 67/2871; H04L 69/326; H04L 69/08; H04L 29/06068; H04L 29/08756; H04L 29/06224; H04L 65/601; H04L 12/2836
See application file for complete search history.

(56) References Cited

U.S. PATENT DOCUMENTS

| | | | |
|---|---|---|---|
| 6,683,883 B1 * | 1/2004 | Czeiger | H04L 12/66 370/401 |
| 7,382,776 B1 * | 6/2008 | Chan | H04L 45/7453 370/392 |
| 10,230,688 B1 * | 3/2019 | Subbiah | H04L 61/2596 |

(Continued)

*Primary Examiner* — Hitesh Patel
*Assistant Examiner* — Vinh Nguyen
(74) *Attorney, Agent, or Firm* — Joseph Mencher

(57) ABSTRACT

An NVMeoF gateway system includes a physical host device that communicates using a host NVMeoF protocol, and a physical target device that communicates using a target NVMeoF protocol. A networking device generates proxy host and target devices that are included in the same zone for the physical host and target devices, respectively. The networking device then converts first host NVMeoF protocol communications from the physical host device to first target NVMeoF protocol communications and provides them to the physical target device using the proxy host device, and converts second target NVMeoF protocol communications from the physical target device to second host NVMeoF protocol communications and provides them to the physical host device using the proxy target device. The first target NVMeoF protocol communications and the second host NVMeoF protocol communications configure the physical host device to exchange data with the physical target device.

20 Claims, 14 Drawing Sheets

(56) References Cited

U.S. PATENT DOCUMENTS

| | | | | |
|---|---|---|---|---|
| 10,873,626 | B2* | 12/2020 | Clark | G06F 16/219 |
| 11,159,612 | B1* | 10/2021 | Puttagunta | H04L 67/1065 |
| 2002/0087887 | A1* | 7/2002 | Busam | H04L 67/1001 |
| | | | | 726/3 |
| 2009/0248804 | A1* | 10/2009 | Ohtani | H04L 67/02 |
| | | | | 709/204 |
| 2009/0313415 | A1* | 12/2009 | Sabaa | H04L 67/1097 |
| | | | | 711/6 |
| 2010/0106836 | A1* | 4/2010 | Schreyer | H04L 67/04 |
| | | | | 709/245 |
| 2014/0359137 | A1* | 12/2014 | Liu | H04L 69/324 |
| | | | | 709/227 |
| 2015/0363284 | A1* | 12/2015 | Ishii | G06F 11/1464 |
| | | | | 714/6.23 |
| 2015/0378640 | A1* | 12/2015 | Huang | G06F 3/0679 |
| | | | | 709/217 |
| 2016/0065387 | A1* | 3/2016 | Pearce | H04L 45/66 |
| | | | | 370/390 |
| 2016/0373301 | A1* | 12/2016 | Sakata | G06F 8/60 |
| 2018/0157444 | A1* | 6/2018 | Franciosi | G06F 3/067 |
| 2020/0293465 | A1* | 9/2020 | Yang | G06F 13/128 |
| 2020/0344329 | A1* | 10/2020 | Cannata | H04L 67/2833 |
| 2021/0042246 | A1* | 2/2021 | Yoshida | G06F 13/1668 |
| 2021/0342276 | A1* | 11/2021 | Patel | G06F 13/20 |

\* cited by examiner

NVME-OVER-FABRICS GATEWAY SYSTEM

BACKGROUND

The present disclosure relates generally to information handling systems, and more particularly to a gateway for communications between information handling systems configured to operate with different Non-Volatile Memory express (NVMe) over Fabrics (NVMeoF) protocols.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, host devices provided by server devices and target devices provided by storage devices, may be connected via network devices such as switch devices in order allow the host devices to store data on the storage devices and retrieve data from the storage devices. Furthermore, those devices may be configured according to Non-Volatile Memory express (NVMe) over Fabrics (NVMeoF) protocols that supports a range of storage networking fabrics for NVMe block storage protocols over storage networking fabrics. As will be appreciated by one of skill in the art in possession of the present disclosure, the use of NVMe storage devices (and other solid-state storage technologies) reduces latency in storage operations, allows parallel reads and writes to any particular storage device in order to increase read/write bandwidth, and/or offers a variety of other benefits known in the art. As such, the implementation of an NVMeoF protocol with Remote Direct Memory Access (RDMA) over Converged Ethernet (ROCE) (an "NVMeoF(RoCE)" protocol), Fibre Channel (FC) (an "NVMeoF(FC)" protocol), and the Transmission Control Protocol (TCP) (an "NVMeoF(TCP)" protocol) may provide substantial performance benefits and/or efficiencies to any existing storage system. However, the use of NVMeoF protocols with storage system and their connected server devices can create issues.

For example, in an existing storage system utilizing a "native" FC over Small Computer System Interface (SCSI) (FC)) protocol, the conversion of that existing storage system to utilize the NVMeoF(TCP) protocol is relatively expensive as it requires the user to replace the relatively expensive SCSI(FC)-protocol-supporting storage infrastructure with a storage infrastructure that supports the NNMeoF (TCP protocol, while the conversion of that existing storage system to an NVMeoF(FC) protocol is relatively inexpensive and may only require providing NVMe storage devices and NVMeoF(FC) protocol firmware with the existing storage infrastructure. As such, the conversion of the existing server system and/or existing networking system to utilize the NVMeoF(TCP) protocol is relatively expensive, and requires the replacement/updating of the existing storage infrastructure to support the NVMeoF protocol in order to enable communications between the server system and the storage system utilizing the NVMeoF(TCP) protocol. Thus, the implementation of NVMeoF protocols (e.g., such as the implementation of the NVMeoF(TCP) protocol on a server system and networking system) may be delayed, particularly when the costs associated with doing so (e.g., the need to convert the storage infrastructure to support the NVMeoF (TCP) protocol) cannot be justified with relatively recently purchased server systems and/or networking systems.

Accordingly, it would be desirable to provide an NVMeoF gateway system that addresses the issues discussed above.

SUMMARY

According to one embodiment, an Information Handling System (IHS) includes a processing system; and a memory system that is coupled to the processing system and that includes instructions that, when executed by the processing system, cause the processing system to provide a gateway engine that is configured to: generate a proxy host device for a physical host device that is coupled to the processing system, and a proxy target device for a physical target device that is coupled to the processing system, wherein the proxy host device and the proxy target device are included in the same zone; convert first host Non-Volatile Memory express (NVMe) over Fabrics (NVMeoF) protocol communications received from the physical host device to first target NVMeoF protocol communications and provide the first target NVMeoF protocol communications to the physical target device using the proxy host device; and convert second target NVMeoF protocol communications received from the physical target device to second host NVMeoF protocol communications and provide the second host NVMeoF protocol communications to the physical host device using the proxy target device, wherein the first target NVMeoF protocol communications and the second host NVMeoF protocol communications configure the physical host device to store data on the physical target device and retrieve data from the physical target device.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
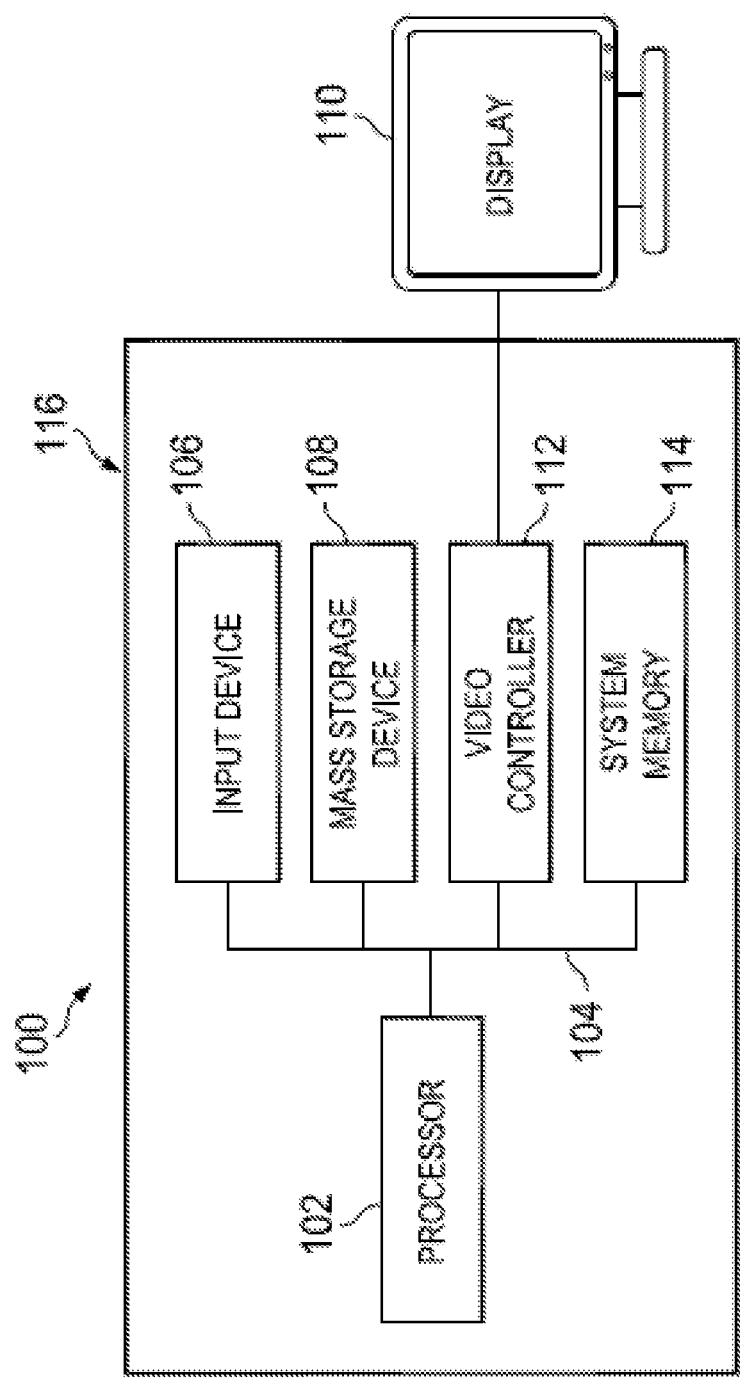
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
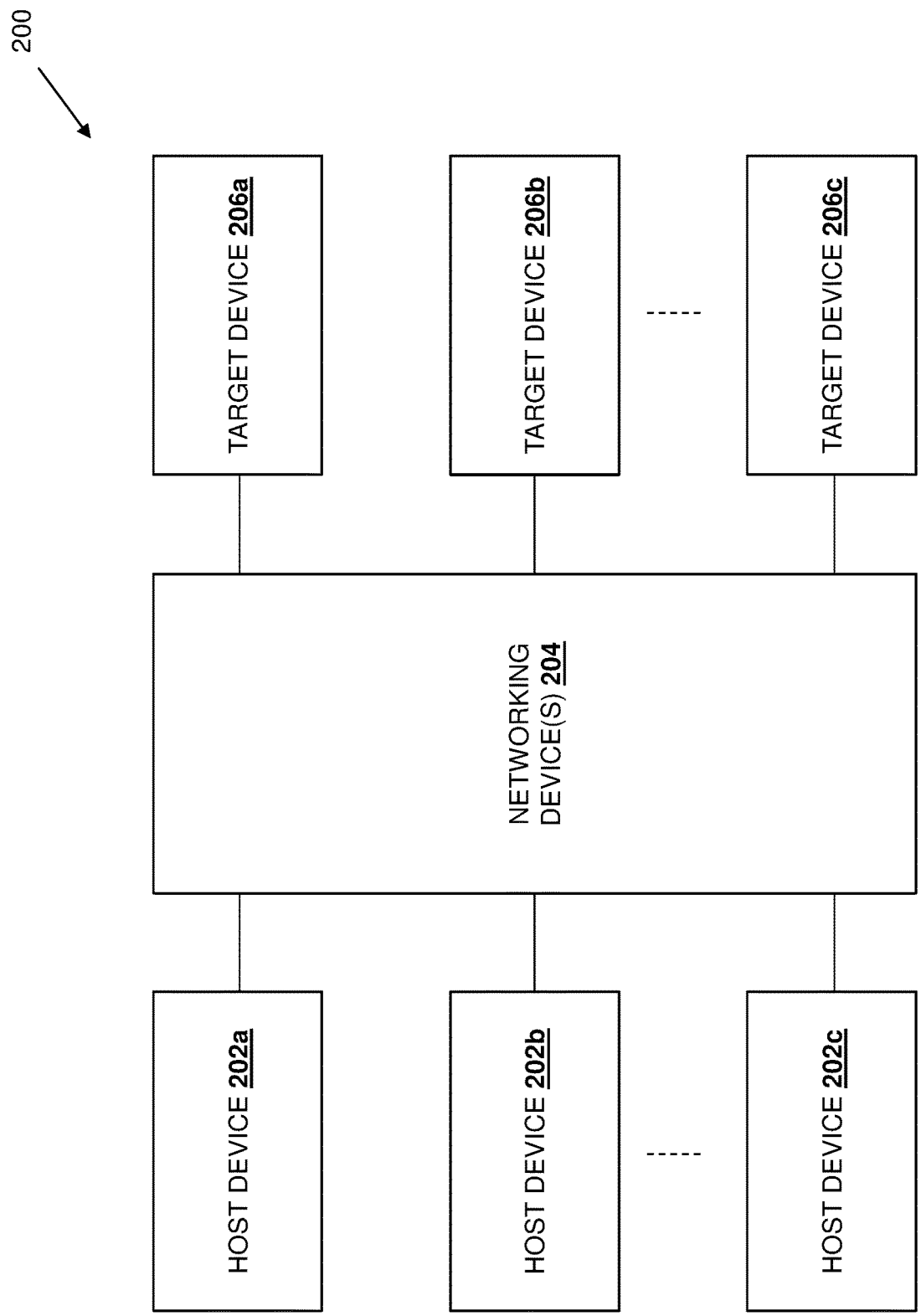
FIG. 2 is a schematic view illustrating an embodiment of a Non-Volatile Memory express (NVMe) over Fabrics (NVMeoF) gateway system.

Referring now to FIG. 2, an embodiment of a Non-Volatile Memory express (NVMe) over Fabrics (NVMeoF) gateway system 200 is illustrated. In the illustrated embodiment, the NVMeoF gateway system 200 includes a plurality of host devices 202a, 202b, and up to 202c. In an embodiment, the host devices 202a-202c may be provided by the IHS 100 discussed above with reference to FIG. 1, and/or may include some or all of the components of the IHS 100, and in the specific examples below are described as being provided by server devices that are configured to communicate using a Transmission Control Protocol (TCP)-based NVMeoF (NVMeoF(TCP)) protocol. As will be appreciated by one of skill in the art in possession of the present disclosure, the configuration of server devices to operate using the NVMeoF(TCP) protocol may not require changes to the existing server infrastructure, and rather may simply require the provisioning of NVMeoF protocol firmware on the existing server infrastructure, thus providing for a relatively inexpensive implementation of NVMeoF functionality on an existing server system. However, while illustrated and discussed as being provided by server devices that communicate via a specific NVMeoF protocol, one of skill in the art in possession of the present disclosure will recognize that host devices provided in the NVMeoF gateway system 200 may include any devices that may be configured to communicate via other NVMeoF protocols and operate similarly as the host devices 202a-202c discussed below.

In the illustrated embodiment, the NVMeoF gateway system 200 also includes one or more networking devices 204 that are coupled to each of the host devices 202a-202c. In an embodiment, the networking device(s) 204 may be provided by the IHS 100 discussed above with reference to FIG. 1, and/or may include some or all of the components of the IHS 100, and in the specific examples below are described as being provided by switch devices. However, while illustrated and discussed as being provided by switch devices, one of skill in the art in possession of the present disclosure will recognize that networking devices provided in the NVMeoF gateway system 200 may include any devices that may be configured to operate similarly as the networking device(s) 204 discussed below.

In the illustrated embodiment, the NVMeoF gateway system 200 also includes a plurality of target devices 206a, 206b, and up to 206c that are each coupled to the networking device(s) 204. In an embodiment, the target devices 206a-206c may be provided by the IHS 100 discussed above with reference to FIG. 1, and/or may include some or all of the components of the IHS 100, and in the specific examples below are described as being provided by storage devices that are configured to communicate using a Fibre Channel (FC)-based NVMeoF (NVMeoF(FC)) protocol. As will be appreciated by one of skill in the art in possession of the present disclosure, the configuration of storage devices to operate using the NVMeoF(FC) protocol may not require changes to the existing storage infrastructure, and rather may simply require the provisioning of NVMe storage devices (or other solid-state storage technologies) and NVMeoF protocol firmware on the existing storage infrastructure, thus providing for a relatively inexpensive implementation of NVMeoF functionality on an existing storage system. However, while illustrated and discussed as being provided by storage devices that communicate via a specific NVMeoF protocol, one of skill in the art in possession of the present disclosure will recognize that target devices provided in the NVMeoF gateway system 200 may include any devices that may be configured to communicate via other NVMeoF protocols and operate similarly as the target devices 206a-206c discussed below. As such, while a specific NVMeoF gateway system 200 has been illustrated and described, one of skill in the art in possession of the present disclosure will recognize that the NVMeoF gateway system of the present disclosure may include a variety of components and component configurations while remaining within the scope of the present disclosure as well.

Figure 3:
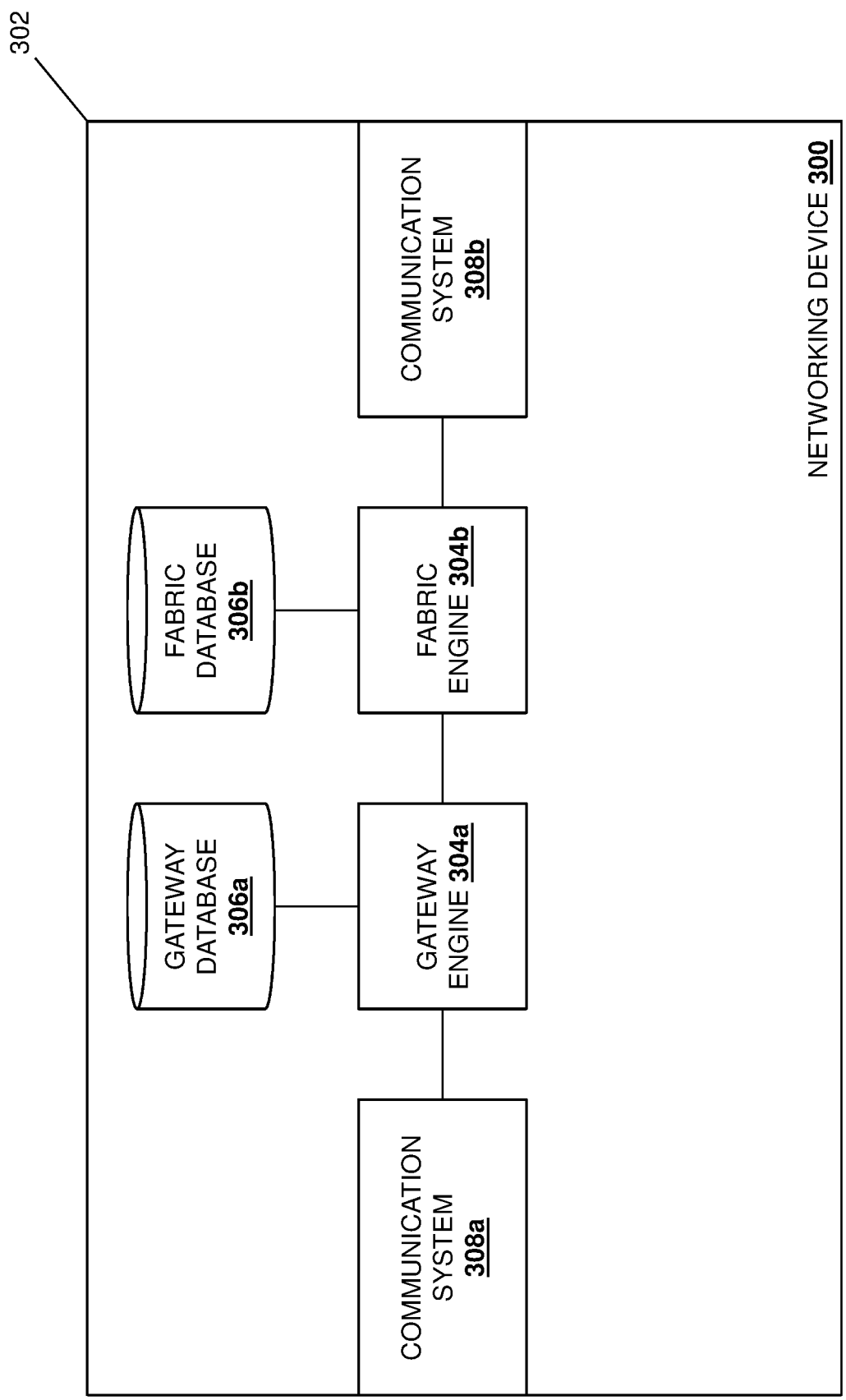
FIG. 3 is a schematic view illustrating an embodiment of a networking device included in the NVMeoF gateway system of FIG. 2.

Referring now to FIG. 3, an embodiment of a networking device 300 is illustrated that may provide the networking device(s) 204 discussed above with reference to FIG. 2. As such, the networking device 300 may be provided by the IHS 100 discussed above with reference to FIG. 1 and/or may include some or all of the components of the IHS 100, and in specific examples may be provided by a switch device. However, while illustrated and discussed as being provided by a switch device, one of skill in the art in possession of the present disclosure will recognize that the functionality of the networking device 300 discussed below may be provided by other devices that are configured to operate similarly as the networking device 300 discussed below. In the illustrated embodiment, the networking device 300 includes a chassis 302 that houses the components of the networking device 300, only some of which are illustrated below.

For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide a gateway engine 304a that is configured to perform the functionality of the gateway engines and/or networking devices discussed below, and a fabric engine 304b that is configured to perform the functionality of the fabric engines and/or networking devices discussed below. However, while the specific examples below describe a fabric engine 304b that provides a "native" Fibre Channel entity that supports Fibre Channel communications and connects directly to the target devices 206a-206c, along with a gateway engine 304a that supports Ethernet communications, connects directly to the host devices 202a-202c, presents the fabric engine 304b with proxy host devices that operate like server devices that support Fibre Channel communications, and presents the host devices 202a-202c with proxy target devices that operate like storage devices that support Ethernet communications, one of skill in the art in possession of the present disclosure will recognize that the functionality described for the gateway engine 304a and the fabric engine 304b below may be provided in a variety of manners that will fall within the scope of the present disclosure as well.

The chassis 302 may also house a storage system (not illustrated, but which may include the storage 108 discussed above with reference to FIG. 1) that is coupled to the gateway engine 304a and the fabric engine 304b (e.g., via a coupling between the storage system and the processing system) and that includes a gateway database 306a that is configured to store any of the information utilized by the gateway engine 304a discussed below, and a fabric database 306b that is configured to store any of the information utilized by the fabric engine 304b discussed below. The chassis 302 may also house a communication system 308a and a communication system 308b that are coupled to the gateway engine 304a and the fabric engine 304b, respectively (e.g., via a coupling between the communication systems 308a and 308b and the processing system), and that may be provided by Network Interface Controller(s) (NIC(s)), wireless communication systems (e.g., BLUETOOTH®, Near Field Communication (NFC) components, WiFi components, etc.), and/or any other communication components that would be apparent to one of skill in the art in possession of the present disclosure. However, while a specific networking device 300 has been illustrated, one of skill in the art in possession of the present disclosure will recognize that networking devices (or other devices operating according to the teachings of the present disclosure in a manner similar to that described below for the networking device 300) may include a variety of components and/or component configurations for providing conventional networking device functionality, as well as the functionality discussed below, while remaining within the scope of the present disclosure as well.

Figure 4:
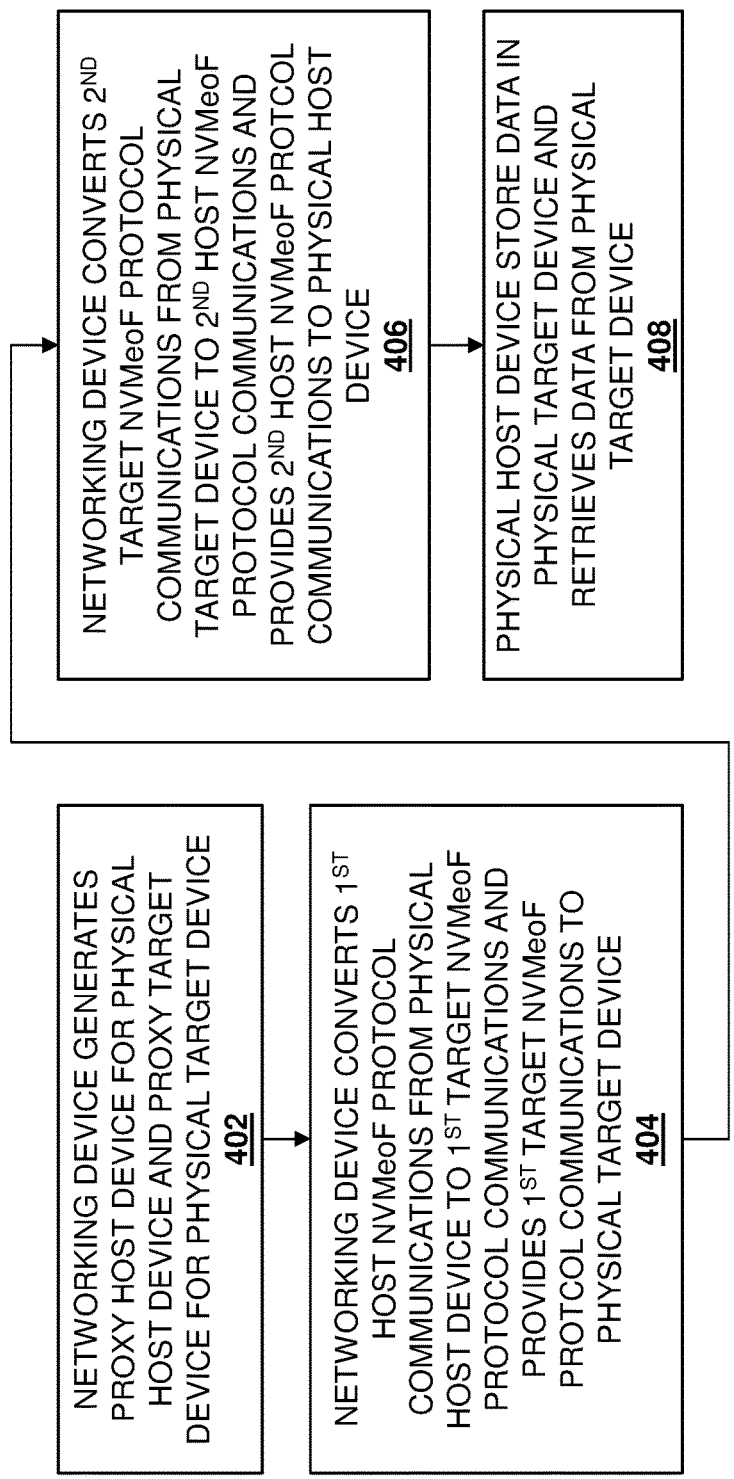
FIG. 4 is a flow chart illustrating an embodiment of a method for providing an NVMeoF gateway.

Referring now to FIG. 4, an embodiment of a method 400 for providing an NVMeoF gateway is illustrated. As discussed below, the systems and methods of the present disclosure provide for the translation between different NVMeoF protocols (e.g., the NVMeoF(TCP) protocol and the NVMeoF(FC) protocol in the examples below) to allow a storage network that has been provided with NVMeoF storage devices to operate with server devices and switch devices without requiring changes in their corresponding server and/or switch infrastructure. For example, the NVMeoF gateway system of the present disclosure may include a physical host device that communicates using a host NVMeoF protocol, and a physical target device that communicates using a target NVMeoF protocol. A networking device generates proxy host and target devices that are included in the same zone for the physical host and target devices, respectively. The networking device then converts first host NVMeoF protocol communications from the physical host device to first target NVMeoF protocol communications and provides them to the physical target device using the proxy host device, and converts second target NVMeoF protocol communications from the physical target device to second host NVMeoF protocol communications and provides them to the physical host device using the proxy target device. The first target NVMeoF protocol communications and the second host NVMeoF protocol communications configure the physical host device to exchange data with the physical target device. As such, existing server and/or switch infrastructure may utilize a host NVMeoF protocol to operate with a storage network that has been updated with NVMe storage devices and that utilizes a target NVMeoF protocol that is different than the host NVMeoF protocol, thus reducing the costs associated with implementing the NVMeoF protocols and increasing NVMeoF adoption and associated benefits.

In the examples discussed below, the target devices 206a-206c that are provided by storage devices in a storage network that have been updated with NVMe storage devices and that are configured to operate according to the NVMeoF (FC) protocol, while the host devices 202a-202c are provided by server devices that have been configured to operate according to the NVMeoF(TCP) protocol. However, while specific devices updated with specific hardware and configured with specific NVMeoF protocols are described, one of skill in the art in possession of the present disclosure will appreciate that the NVMeoF gateway system of the present disclosure may utilize other devices (e.g., other than the server devices and storage devices described herein) that may be updated with other hardware (e.g., other than the NVMe storage devices described herein) and configured to operate according to other NVMeoF protocols (e.g., other than the NVMeoF(TCP) and NVMeoF(FC) protocols described herein) while remaining within the scope of the present disclosure as well.

In the examples provided below, the NVMeoF gateway system performs proxy port creation operations that include the generation of proxy host devices and proxy target devices, zoning operations that create a zone that includes proxy host devices and proxy target devices that operate together, and termination/translation/binding operations that ensure that host and target communications terminate at the gateway engine in the networking device, that provide for the translation of communications between different NVMeoF protocols, and that bind host NVMeoF protocol communications from the host device with target NVMoeF protocol communications from the target device. However, as discussed below, the proxy port creation operations, zoning operations, and termination/translation/binding operations may differ depending on the configuration of the NVMeoF gateway system.

The method 400 begins at block 402 where a networking device generates a proxy host device for a physical host device and a proxy target device for a physical target device. In an embodiment, during or prior to the method 400, the host devices 202a-202c, the networking device 204, and the target devices 206a-206c may be connected together and powered on, reset, booted, and/or otherwise initialized. However, while the method 400 is described as beginning following an initialization of the host devices 202a-202c, networking device 204, and target devices 206a-c, one of skill in the art in possession of the present disclosure will appreciate that the method 400 may be performed in other situations that will fall within the scope of the present disclosure as well.

Figure 5A:
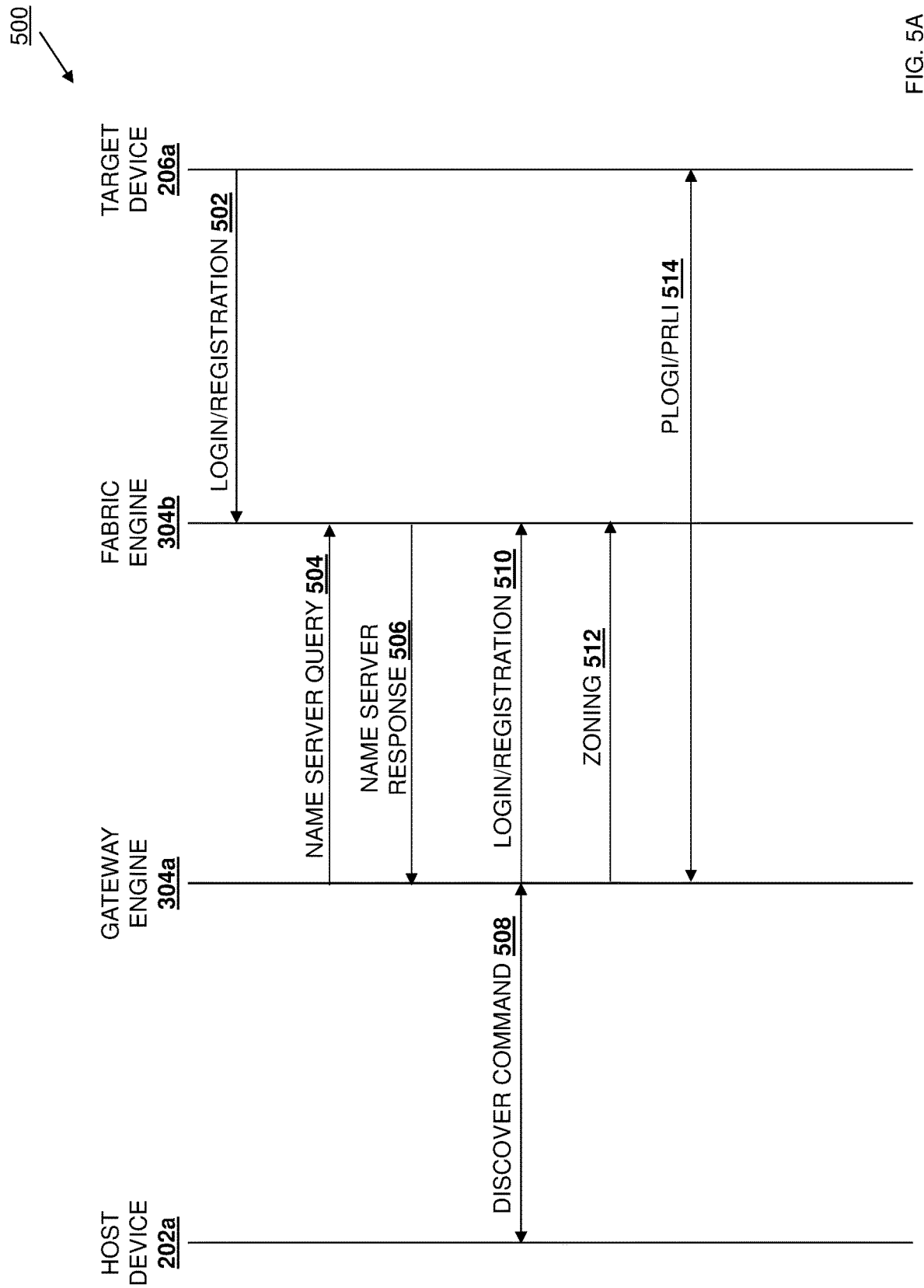
FIG. 5A is a swim-lane diagram illustrating an embodiment of operations performed by the NVMeof gateway system of FIGS. 2 and 3 during the method of FIG. 4.

In the example below, a swim-lane diagram illustrated in FIG. 5A is provided to describe specific operations that may be performed in order to generate a proxy host device for the host device 202a and a proxy target device for the target device 206a, but one of skill in the art in possession of the present disclosure will recognize that proxy host devices may be generated for the host devices 202b-202c and proxy target devices may be generated for the target devices 206b-206c in a similar manner, and that other operations may be performed in place of (or in addition to) the operations illustrated and described with reference to FIG. 5A while remaining within the scope of the present disclosure as well.

With reference to FIG. 5A, an embodiment of proxy device generation operations 500 that may be performed at block 402 are illustrated. In some embodiments, prior to the performance of the proxy device generation operations 500, a network administrator or other user may configure a zone that includes the gateway engine 304b in the networking device 204 and each of the target devices 206a-206c, which one of skill in the art in possession of the present disclosure will recognize may include providing the gateway engine 304b with a gateway engine World Wide Name (WWN), and providing each of the target devices 206a-206c with target device WWNs. In an embodiment, at block 402, the target device 206a may generate and transmit a login/registration communication 502 to the fabric engine 304b in the networking device 204 that may include, for example, a Fibre Channel fabric login and name server registration, and/or other login/registration information known in the art. As will be appreciated by one of skill in the art in possession of the present disclosure, the Fibre Channel fabric login may allow the target device 206a (e.g., an FC-NVMe target) to log into a FC fabric provided by the fabric engine 304b, and the name server registration may allow the target device 206a to register with a name server (e.g., an FC-NVMe name server) provided by the fabric engine 304b. As will be appreciated by one of skill in the art in possession of the present disclosure, the fabric login operations and/or registration operations by the target device 206a may include the target device 206a identifying itself (e.g., as an NVMe target device) and identifying the protocol (e.g., the NVMeoF (FC)) protocol) that it is configured to use.

In an embodiment, at block 402, the gateway engine 304a in the networking device 204/300 may then generate and transmit a name server query communication 504 to the fabric engine 304b in the networking device 204 that may include, for example, queries for NVMe storage device features, a device type of a target device, and/or other name server query information that would be apparent to one of skill in the art in possession of the present disclosure. In a specific example, the name server query communication 504 may include a query to the name server provided by the fabric engine 304b for a list of target devices/discovery controllers (e.g., NVMe target devices/discovery controllers)

In an embodiment, at block 402, the fabric engine 304b in the networking device 204/300 may then generate and transmit a name server response communication 506 to the gateway engine 304a in the networking device 204 that may include, for example, a list of target devices/discovery controllers (e.g., NVMe target devices/discovery controllers), and/or other name server response information that would be apparent to one of skill in the art in possession of the present disclosure. For example, in response to receiving the list of target devices/discovery controllers (e.g., NVMe target devices/discovery controllers), the gateway engine 304a may generate proxy target devices for each target device/discovery controller identified in the list received from the fabric engine 304b by generating a proxy target address (e.g., a proxy target Internet Protocol (IP) address) for that target device/discovery controller. As such, at block 402 the fabric engine 304b may identify the target device 206a to the gateway engine 304a in the name server response communication 506, and the gateway engine 304a may generate a proxy target device for the target device 206a by generating a proxy target address (e.g., a proxy target IP address) for the target device 206a.

In an embodiment, at block 402 and following the generation of proxy target device(s), the host device 202a and the gateway engine 304a in the networking device 204 may generate and exchange discover command communications 508 that may, for example, identify to the host devices the proxy target address(es) for the proxy target device(s) generated for the target device(s) discussed above, establish connections between host devices and proxy target devices, and/or provide for the performance of other discover command operations that would be apparent to one of skill in the art in possession of the present disclosure. As will be appreciated by one of skill in the art in possession of the present disclosure, the discover command communications 508 from the host device 202a to the gateway engine 304a (e.g., an "NVMe discover" command provided via the host device 202a using the proxy target IP address for the proxy target device generated for the target device 206a and identified by the gateway engine 304a as part of the discover command communications 508) may operate to establish a TCP connection between the host device 202a and the proxy target device generated for the target device 206a.

In an embodiment, at block 402, the gateway engine 304a in the networking device 204 may then generate and transmit a login/registration communication 510 to the fabric engine 304b in the networking device 204 that may include, for example, a Fibre Channel fabric login and name server registration, and/or other login/registration information known in the art. For example, following the establishment of the TCP connection between the host device 202a and the proxy target device generated for the target device 206a, the gateway engine 304a may create a proxy host WWN for the host device 202a (as well as creating a proxy host Fibre Channel stack required to support termination, translation, and binding as discussed herein) that operates to generate a proxy host device for the host device 202a, use the Fibre Channel fabric login to log that proxy host device into the Fibre Channel fabric provided by the fabric engine 304b, and use the name server registration to register that proxy host device with the name server provided by the fabric engine 304b as an NVMe-type (e.g., "type 0x28") Fibre Channel device that is operating as a host (e.g., a "host feature"). Thus, following these operations, the target device 206a and the proxy host device generated for the host device 202a are each logged into the Fibre Channel fabric provided by the fabric engine 304b.

In an embodiment, at block 402, the gateway engine 304a in the networking device 204 may then generate and transmit zoning communications 512 to the fabric engine 304b in the networking device 204 that may include, for example, a variety of zoning information known in the art. For example, based on the proxy target address (e.g., the proxy target IP address) received by the gateway engine 304a in the discover command communications 508 from the host device 202a, the gateway engine 304a will identify that the host device 202a needs to communicate with the target device 206a and, in response, may generate and transmit the zoning communications 512. In an embodiment, the zoning communications 512 may be Target Driven Zoning (TDZ) communications that utilize TDZ, which provides dynamic zoning operations that may include selecting the proxy host device generated for the host device 202a as a "principal" associated with a zone, and pushing a proxy target WWN associated with the proxy target device generated for the target device 206a as a "member" of that zone (i.e., to the fabric engine 304a via the zoning communications 512), which operates to create a zone that includes the proxy host device generated for the host device 202a and the proxy target device generated for the target device 206a. As will be appreciated by one of skill in the art in possession of the present disclosure, in the event TDZ is not supported by the NVMeoF gateway system 200, a zone that includes the proxy host device generated for the host device 202a and the proxy target device generated for the target device 206a may be created using a host/target mapping provided by a network administrator or other user in a mapping table that maps proxy host addresses (proxy host IP addresses) to proxy target WWNs for any proxy host device and proxy target devices that should be included in the same zone.

Figure 6:
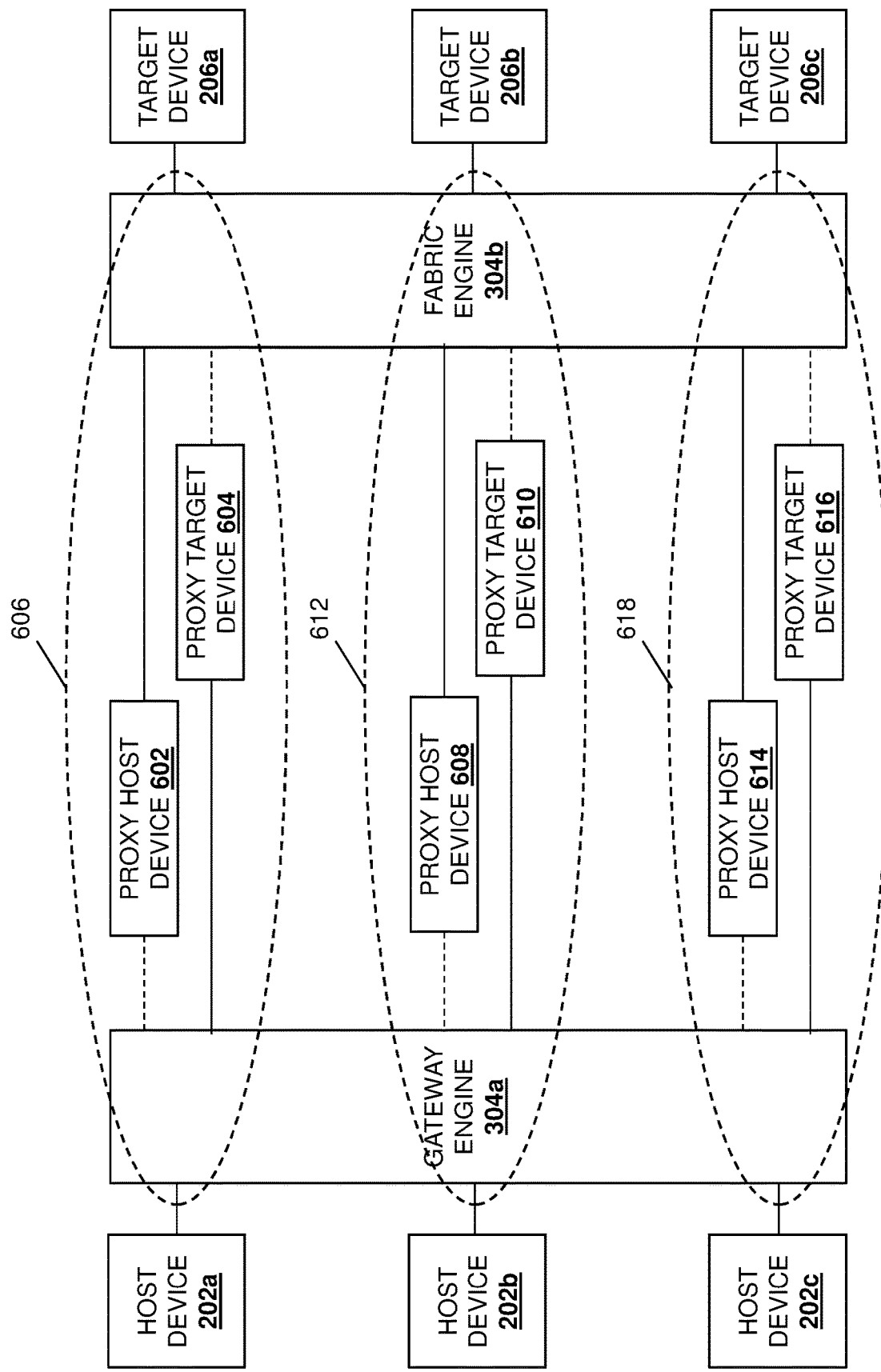
FIG. 6 is a schematic view illustrating an embodiment of the NVMeoF gateway system of FIGS. 2 and 3 following the method of FIG. 4.

With reference to FIG. 6, an embodiment of proxy host devices and proxy target devices provided in zones is illustrated. Thus, using the techniques described above, a proxy host device 602 (e.g., a proxy Fibre Channel (FC) host) may be generated for the host device 202a, a proxy target device 604 (e.g., a proxy Transmission Control Protocol (TCP) target) may be generated for the target device 206a, and each of the proxy host device 602 and the proxy target device 604 may be included in a zone 606. As will be appreciated by one of skill in the art in possession of the present disclosure, proxy host device 608 (e.g., a proxy FC host) may also be generated for the host device 202b, a proxy target device 610 (e.g., a proxy TCP target) may also be generated for the target device 206b, and each of the proxy host device 608 and the proxy target device 610 may be included in a zone 612 using the techniques discussed above. Similarly, a proxy host device 614 (e.g., a proxy FC host) may be generated for the host device 202c, a proxy target device 616 (e.g., a proxy TCP target) may be generated for the target device 206c, and each of the proxy host device 614 and the proxy target device 616 may be included in a zone 618 using the techniques discussed above as well.

In an embodiment, at block 402, the target device 206a and the gateway engine 304a in the networking device 204/300 may then generate and exchange port login (PLOGI) and process login (PRLI) communications 514 that may include, for example, any of a variety of PLOGI and PRLI information known in the art. For example, the gateway engine 304a may originate the PLOGI and PRLI communications 514 such that they appear to come from the proxy host device generated for the host device 202a, and the target device 206a may respond with PLOGI and PRLI communications 514 that are directed to the proxy host device generated for the host device 202a, which operates to log the proxy host device generated for the host device 202a into ports and processes associated with the target device 206a. As will be appreciated by one of skill in the art in possession of the present disclosure, the PLOGI and PRLI communications 514 may be performed by a discovery subsystem in the target device 206a using a proxy host WWN Fibre Channel Identifier (FC-ID) for the proxy host device generated for the host device 202a.

The method 400 then proceeds to block 404 where the networking device converts first host NVMeoF protocol communications from the physical host device to first target NVMeoF protocol communications and provides the first target NVMeoF protocol communications to the physical target device, and to block 406 the networking device converts second target NVMeoF protocol communications from the physical target device to second host NVMeoF protocol communications and provides the second host NVMeoF protocol communications to the physical host device. As will be appreciated by one of skill in the art in possession of the present disclosure, blocks 404 and 406 may each be performed during the same time period in order to allow the host devices 202a-202c and target devices 206a-206c to communicate using their different NVMeoF protocols via the gateway engine 304a in the networking device 204/300 translating between those NVMeoF protocols.

Figure 5B:
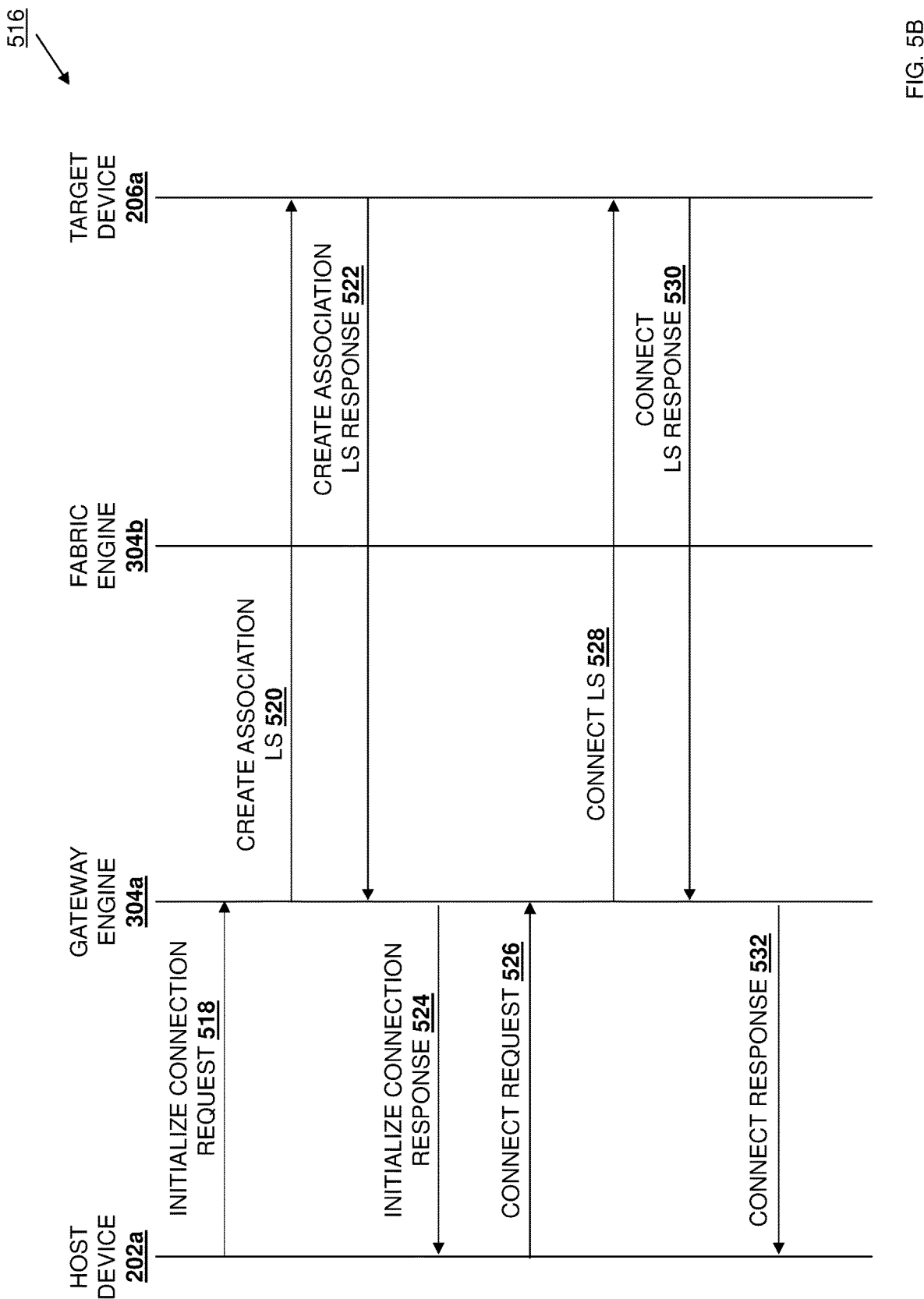
FIG. 5B is a swim-lane diagram illustrating an embodiment of operations performed by the NVMeof gateway system of FIGS. 2 and 3 during the method of FIG. 4.
Figure 5C:
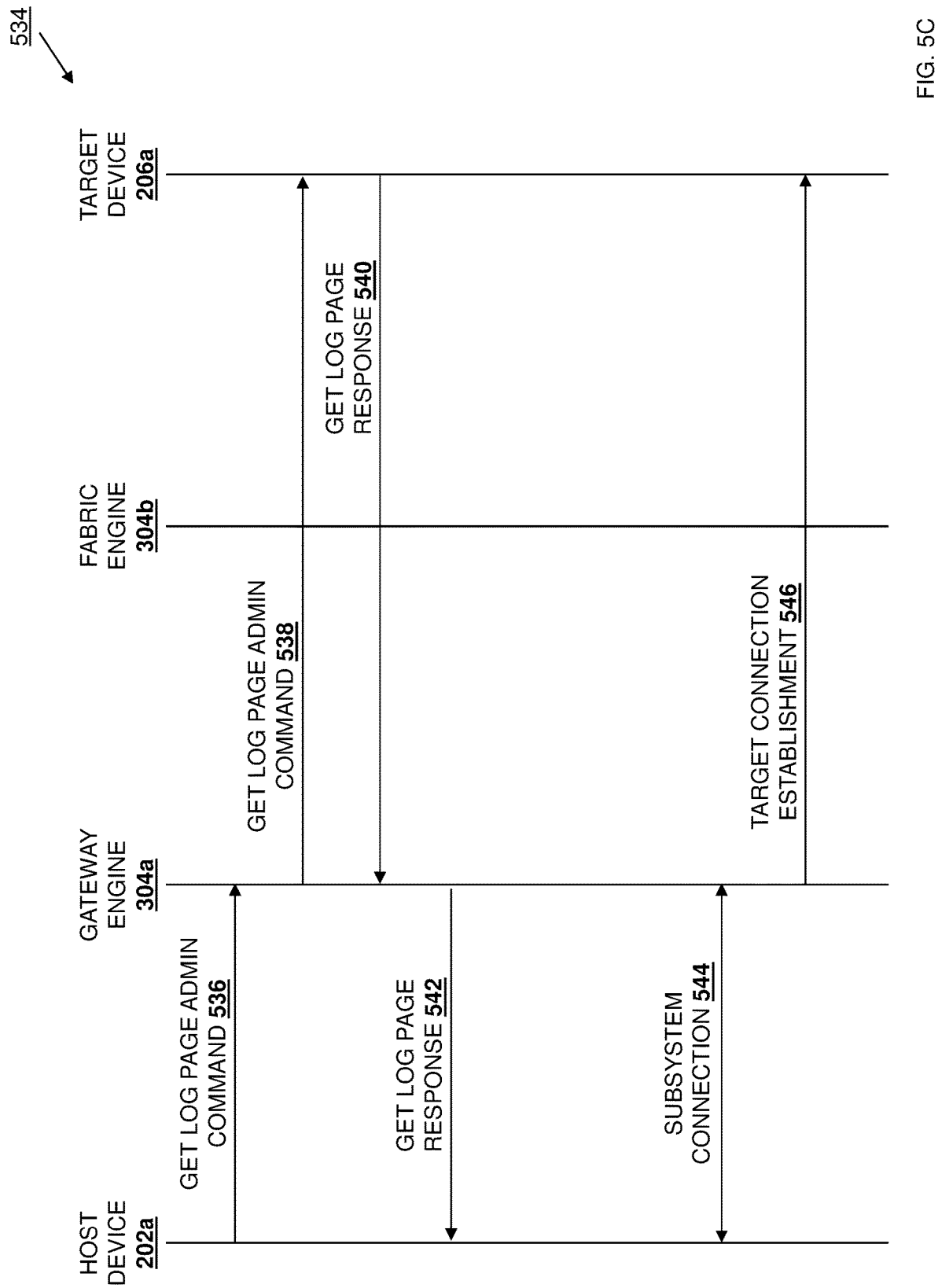
FIG. 5C is a swim-lane diagram illustrating an embodiment of operations performed by the NVMeof gateway system of FIGS. 2 and 3 during the method of FIG. 4.

In the example below, swim-lane diagrams illustrated in FIGS. 5B and 5C are provided to describe specific operations that may be performed in order set up communications between the host device 202a and the target device 206a, but one of skill in the art in possession of the present disclosure will recognize that communications between the host devices 202b-202c and the target devices 206b-206c may be provided in a similar manner, and that other operations may be performed in place of (or in addition to) the operations illustrated and described with reference to FIGS. 5B and 5C while remaining within the scope of the present disclosure as well.

With reference to FIG. 5B, an embodiment of host/target communication connection operations 516 that may be performed at blocks 404 and 406 are illustrated. In an embodiment, at block 404, the host device 202a may generate and transmit an initialize connection request communication 518 to the gateway engine 304a in the networking device 204/300 that may include any of a variety of initialize connection request information (e.g., NVMe discover process information) that would be apparent to one of skill in the art in possession of the present disclosure. In response to receiving the initialize connection request communication 518, the gateway engine 304a may operate to convert the initialize connection request communication 518 to a create association Link Service (LS) communication 520 (e.g., an NVMe "create association" communication) and transmit the create association LS communication 520 to the target device 206a (e.g., to a discovery service subsystem associated with the target device 206a) such that the create association LS communication 520 appears to come from the proxy host device generated for the host device 202a.

In an embodiment, at block 406 and in response to receiving the create association LS communication 520, the target device 206a may generate and transmit a create association LS response communication 522 to the gateway engine 304a in the networking device 204/300 that may include any of a variety of create association LS response information that would be apparent to one of skill in the art in possession of the present disclosure. In response to receiving the create association LS response communication 522, the gateway engine 304a may operate to convert the create association LS response communication 522 to an initialize connection response communication 524 and transmit the initialize connection response communication 524 to the host device 202a such that the initialize connection response communication 524 appears to come from the proxy target device generated for the target device 206a.

In an embodiment, at block 404 and in response to receiving the initialize connection response communication 524, the host device 202a may generate and transmit a connect request communication 526 (e.g., an NVMeoF (TCP) "connect command" communication) to the gateway engine 304a in the networking device 204/300 that may include any of a variety of connect request information that would be apparent to one of skill in the art in possession of the present disclosure. In response to receiving the connect request communication 526, the gateway engine 304a may operate to convert the connect request communication 526 to a connect LS communication 528 (e.g., an NVMe "connect LS" communication) and transmit the connect LS communication 528 to the target device 206a (e.g., a discovery service subsystem corresponding to the connect request communication 526 received from the host device 202a) such that the connect LS communication 528 appears to come from the proxy host device generated for the host device 202a.

In an embodiment, at block 406 and in response to receiving the connect LS communication 528, the target device 206a may generate and transmit a connect LS response communication 530 to the gateway engine 304a in the networking device 204/300 that may include any of a variety of connect LS response information that would be apparent to one of skill in the art in possession of the present disclosure. In response to receiving the connect LS response communication 530, the gateway engine 304a may operate to convert the connect LS response communication 530 to a connect response communication 532 and transmit the connect response communication 532 to the host device 202a such that the connect response communication 532 appears to come from the proxy target device generated for the target device 206a. As will be appreciated by one of skill in the art in possession of the present disclosure, the host/target communication connection operations 516 may result in the creation of an administrative queue for a discovery service subsystem associated with the target device 206a.

With reference to FIG. 5C, an embodiment of host/target communication establishment operations 516 that may be performed at blocks 404 and 406 are illustrated. In an embodiment, at block 404, the host device 202a may generate and transmit a get log page admin command communication 536 to the gateway engine 304a in the networking device 204/300 that may include any of a variety of get log page admin command information that one of skill in the art in possession of the present disclosure would recognize are providing for the retrieval of a list of available subsystems in the target device 206a. In response to receiving the get log page admin command communication 536, the gateway engine 304a may operate to perform "protocol binding" that converts the get log page admin command communication 536 to a get log page admin command communication 538, and transmit the get log page admin command communication 538 to the target device 206a (e.g., to the administrative queue for a discovery service subsystem associated with the target device 206a) such that the get log page admin command communication 538 appears to come from the proxy host device generated for the host device 202a.

In an embodiment, at block 406 and in response to receiving the get log page admin command communication 538, the target device 206a may generate and transmit a get log page response communication 540 to the gateway engine 304a in the networking device 204/300 that may include any of a variety of get log page response information (e.g., a list of available subsystems in the target device 206a (e.g., subsystem NVMe Qualified Names (NQNs)) that would be apparent to one of skill in the art in possession of the present disclosure. In response to receiving the get log page response communication 540, the gateway engine 304a may operate to perform "protocol binding" that converts the get log page response communication 540 to a get log page response communication 542, and transmit the get log page response communication 542 to the host device 202a such that the get log page response communication 542 appears to come from the proxy target device generated for the target device 206a.

As will be appreciated by one of skill in the art in possession of the present disclosure, upon receiving the list of available subsystems in the target device 206a (e.g., subsystem NQNs), the host device 202a may perform operations to connect to each subsystem. For example, at block 404, the host device 202a and the gateway engine 304a in the networking device 204/300 may generate and exchange subsystem connection communications 544 (e.g., starting with an NVMe "connect" communication for a subsystem NQN in the target device 206a that is generated and transmitted by the host device 202a) that may include the exchange of any of a variety of subsystem connection information that would be apparent to one of skill in the art in possession of the present disclosure. In response to receiving the subsystem connection communication 544, the gateway engine 304a may transmit a target connection establishment communication 546 to the target device 206a such that the target connection establishment communication 546 appears to come from the proxy host device generated for the host device 202a. Following communication 546, a connection between the target device 206a and the proxy host device generated for the host device 202a is established.

Following the establishment of the connection between the target device 206a and the proxy host device generated for host device 202a, I/O queues for the subsystem(s) in the target device 206a may be created using namespace details in a manner that is similar to that discussed above for the creating of the admin queue (e.g., IC request commands may be converted to NVMe create association commands for I/O queues, connect commands may be converted to NVMe connect LS commands for I/O queues, etc.).

To provide a specific example of the operations illustrated in FIGS. 5A-5C and discussed above, the host device 202a may connect to a subsystem NQN in the target device 206a via the following operations. A TCP connection may be established between the host device 202a and the proxy target IP address for the proxy target device generated for the target device 206a. Upon receiving the initialize connection request communication 518 from the host with the subsystem NQN details, the PLOGI and PRLI communications 514 may be performed with the corresponding subsystem associated with the target device 206a (from the proxy host WWN), and an NVMe create association (i.e., as part of the create association LS communications 520) is then sent to the target device 206a. An NVMe connect LS (i.e., as part of the connect LS communications 528) that corresponds to the NVMeoF(TCP) connect command from the host device 202a is then sent to the target device 206a, which operates to create an admin queue with the subsystem in the target device 206a. The host device 202a may then use an identify command in the admin queue to retrieve namespace details from the subsystem in the target device 206a. NVMeoF protocols do not use "create/delete Input/Output (I/O) submission/completion queue" commands in existing admin queues, so I/O queues for the subsystem in the target device 206a may be created using the "connect" command. Furthermore, I/O queues may also be created for the subsystem in the target device 206a using namespace details similarly as discussed above for the creation of the admin queue.

The method 400 then proceeds to block 408 the physical host device stores data in the physical target device and retrieves data from the physical target device. As will be appreciated by one of skill in the art in possession of the present disclosure, once I/O queues are created for the subsystem(s) in the target device 206a, the host device 202a may perform read and/or write I/O operations on the corresponding namespace in order to read and/or write to the I/O queues for the subsystem(s) in the target device 206a and cause data to be stored on the target device 206a and read from the target device 206a. As such, in an embodiment of block 408, the host device 202a may operate to store data in the target device 206a and retrieve data from the target device 206a.

Thus, systems and methods have been described that provide for the translation between the NVMeoF(TCP) protocol and the NVMeoF(FC) protocol to allow a storage network that has been provided with NVMeoF storage devices to operate with server devices and switch devices without requiring changes in their corresponding server and/or switch infrastructure. For example, the NVMeoF gateway system of the present disclosure may include a physical server device that communicates using an NVMeoF (TCP) protocol, and a physical storage device that communicates using an NVMeoF(FC) protocol. A networking device generates proxy server and storage devices that are included in the same zone for the physical server and storage devices, respectively. The networking device then converts first NVMeoF(TCP) protocol communications from the physical server device to first NVMeoF(FC) protocol communications and provides them to the physical storage device using the proxy server device, and converts second NVMeoF(FC) protocol communications from the physical storage device to second NVMeoF(TCP) protocol communications and provides them to the physical server device using the proxy storage device. The first NVMeoF(FC) protocol communications and the second NVMeoF(TCP) protocol communications configure the physical server device to exchange data with the physical storage device. As such, existing server and/or switch infrastructure may utilize an NVMeoF(TCP) protocol to operate with a storage network that has been updated with NVMe storage devices and that utilizes an NVMeoF(FC) protocol, thus reducing the costs associated with implementing the NVMeoF protocols and increasing NVMeoF adoption and associated benefits.

While specific operations of the NVMeoF gateway system are described above, one of skill in the art in possession of the present disclosure will appreciate that the NVMeoF gateway system of the present disclosure may perform different operations in different situations in order to realize benefits that are similar to those described above. For example, FIGS. 5A-5B and the associated discussion illustrated and describe a host device 202a configured to use the NVMeoF(TCP) protocol and a target device 206a configured to use the NVMeoF(FC) protocol. However, FIGS. 7A-7C illustrated a host device that is configured to use the NVMeoF(FC) protocol and a target device that is configured to use the NVMeoF(TCP) protocol, which operates similarly as discussed above with reference to FIGS. 5A-5C but with a few differences that will be appreciated by one of skill in the art in possession of the present disclosure from the brief discussion below.

Figure 7A:
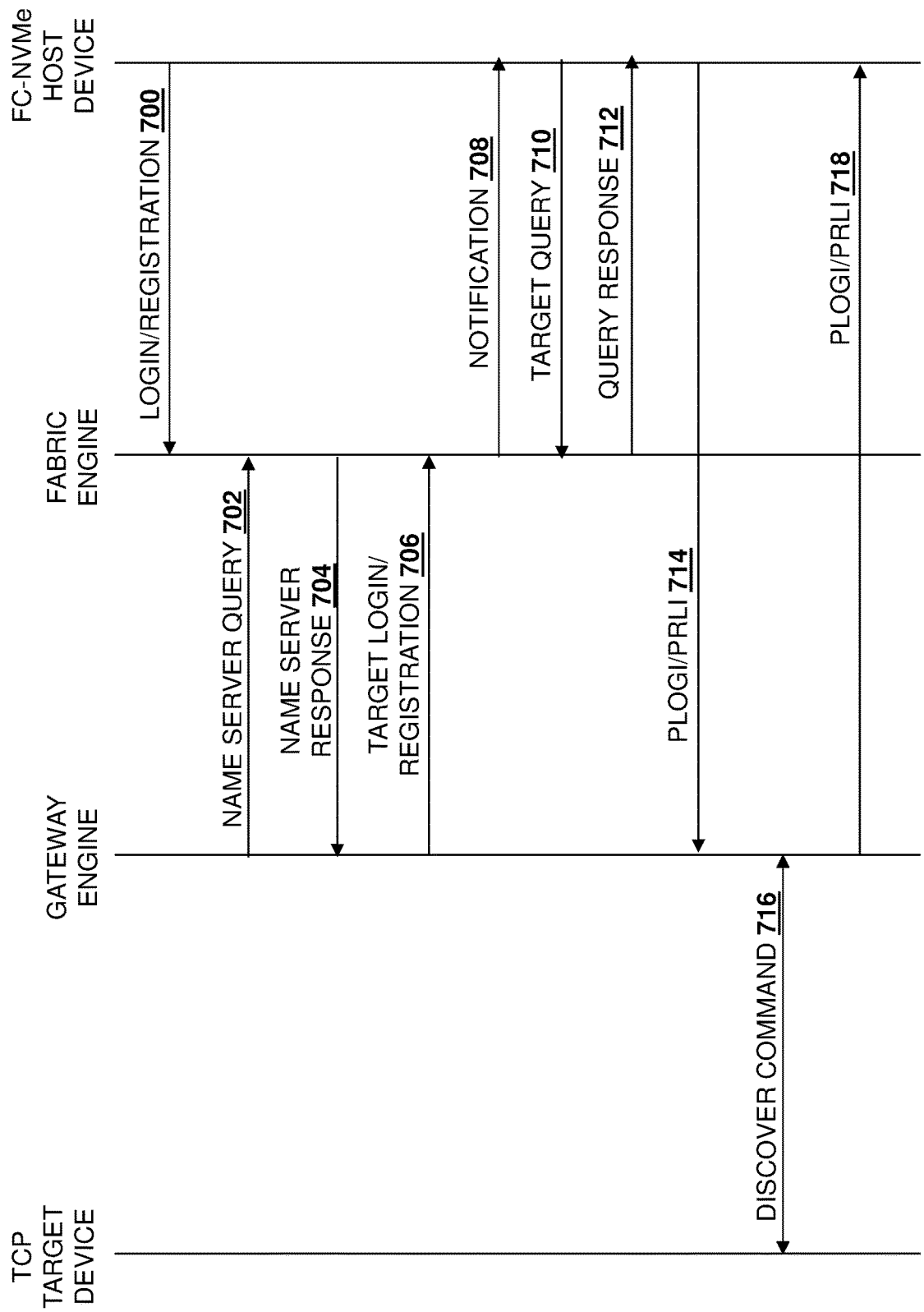
FIG. 7A is a swim-lane diagram illustrating an embodiment of operations performed by an NVMeof gateway system provided according to the teachings of the present disclosure.

For example, FIG. 7A illustrates how the host device may generate and transmit login/registration communications 700 (e.g., Fibre Channel fabric login and name server registration communications) to the fabric engine in the networking device, the gateway engine in the networking device may transmit a name server query communication 702 (e.g., a query for NVMe features and a host type) to the fabric engine, the fabric engine may transmit a name server response communication 704 to the gateway engine, the gateway engine may transmit a target login/registration communication (e.g., a Fibre Channel fabric login and name server registration communication for the proxy target device, along with pushing a TDZ communication that identifies the target device as a principal of a zone and the host device as a member of the zone, which one of skill in the art in possession of the present disclosure will recognize may utilize a host/target mapping that was previously populated and that may be based on an N_Port Identifier Virtualization (NPIV) Proxy Gateway (NPG) mapping between a host WWN and target IP address that creates a proxy WWN for the target when a corresponding Fibre Channel host logs in) to the fabric engine, the fabric engine may transmit a notification communication 708 (e.g., a Registered State Change Notification (RSCN)) to the host device, the host device may transmit a target query communication 710 (e.g., a name server query for a list of NVMe target devices) to the fabric engine, the fabric engine may transmit a query response communication 712 to the host device, the host device may transmit PLOGI/PRLI communications 714 to the gateway engine (e.g., to a proxy target device generated for the target device which, as discussed above, one of skill in the art in possession of the present disclosure will recognize may utilize a host/target mapping that was previously populated and that may be based on an N_Port Identifier Virtualization (NPIV) Proxy Gateway (NPG) mapping between a host WWN and target IP address that creates a proxy WWN for the target when a corresponding Fibre Channel host logs in), the target device may exchange discover command communications 716 (NVMe discovery commands via a TCP connection established between the target device and a proxy host device generated for the host device) with the gateway engine, and the gateway engine may transmit PLOGI/PRLI communications 718 with the host device (e.g., from the host device to the proxy target device generated for the target device).

Figure 7B:
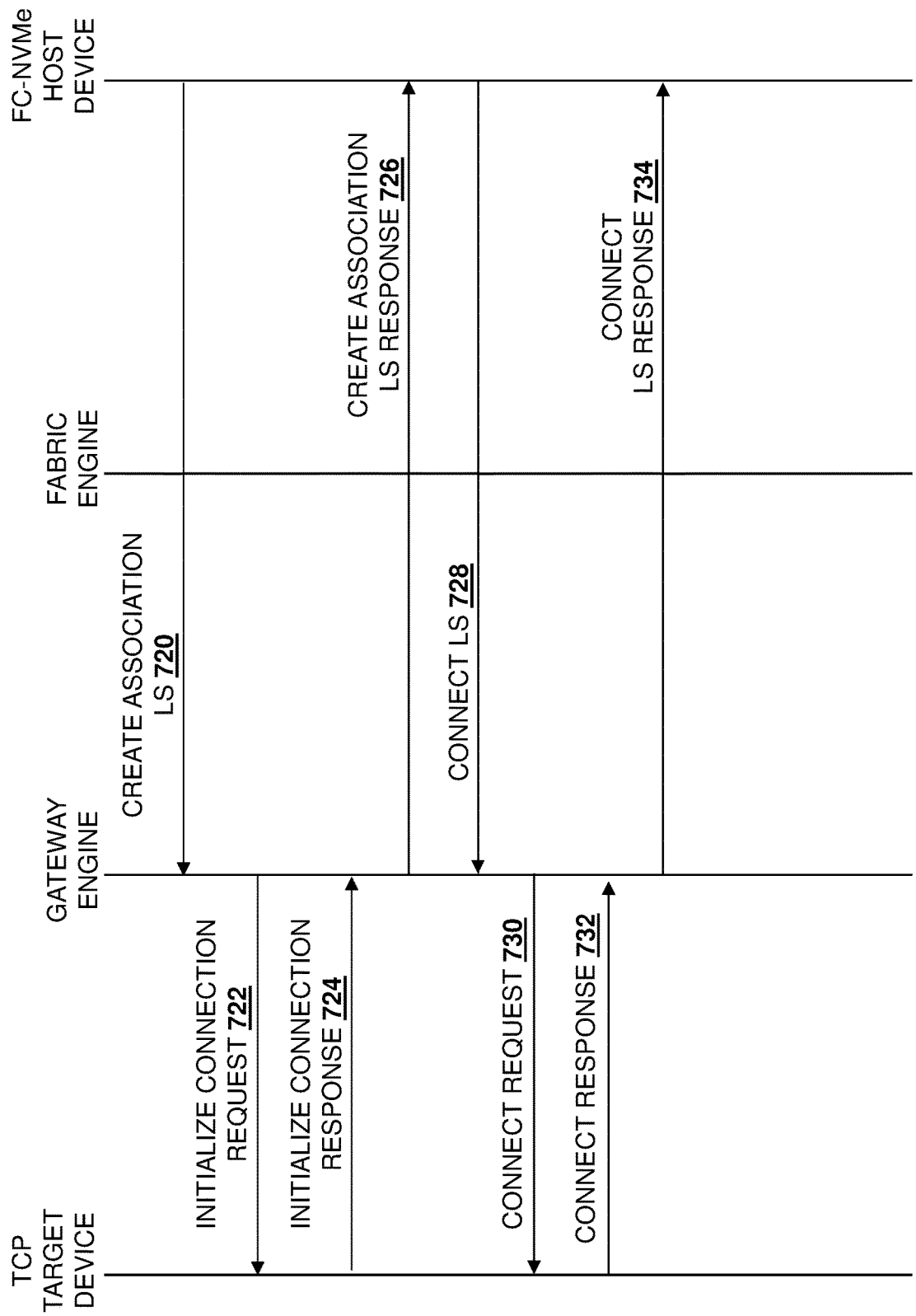
FIG. 7B is a swim-lane diagram illustrating an embodiment of operations performed by an NVMeof gateway system provided according to the teachings of the present disclosure.

Furthermore, FIG. 7B illustrates how the host device may transmit a create association LS communication 720 to the gateway engine in the networking device, the gateway engine may convert the create association LS communication 720 to an initialize connection request communication 722 and transmit the initialize connection request communication 722 to the target device, the target device may transmit an initialize connection response communication 724 to the gateway engine, the gateway engine may convert the initialize connection response communication 724 to a create association LS response communication 726 and transmit the create association LS response communication 726 to the host device, the host device may transmit a connect LS communication 728 to the gateway engine in the networking device, the gateway engine may convert the connect LS communication 728 to a connect request communication 730 and transmit the connect request communication 730 to the target device, the target device may transmit a connect response communication 732 to the gateway engine, the gateway engine may convert the a connect response communication 732 to a connect LS response communication 734 and transmit the connect LS response communication 734 to the host device.

Figure 7C:
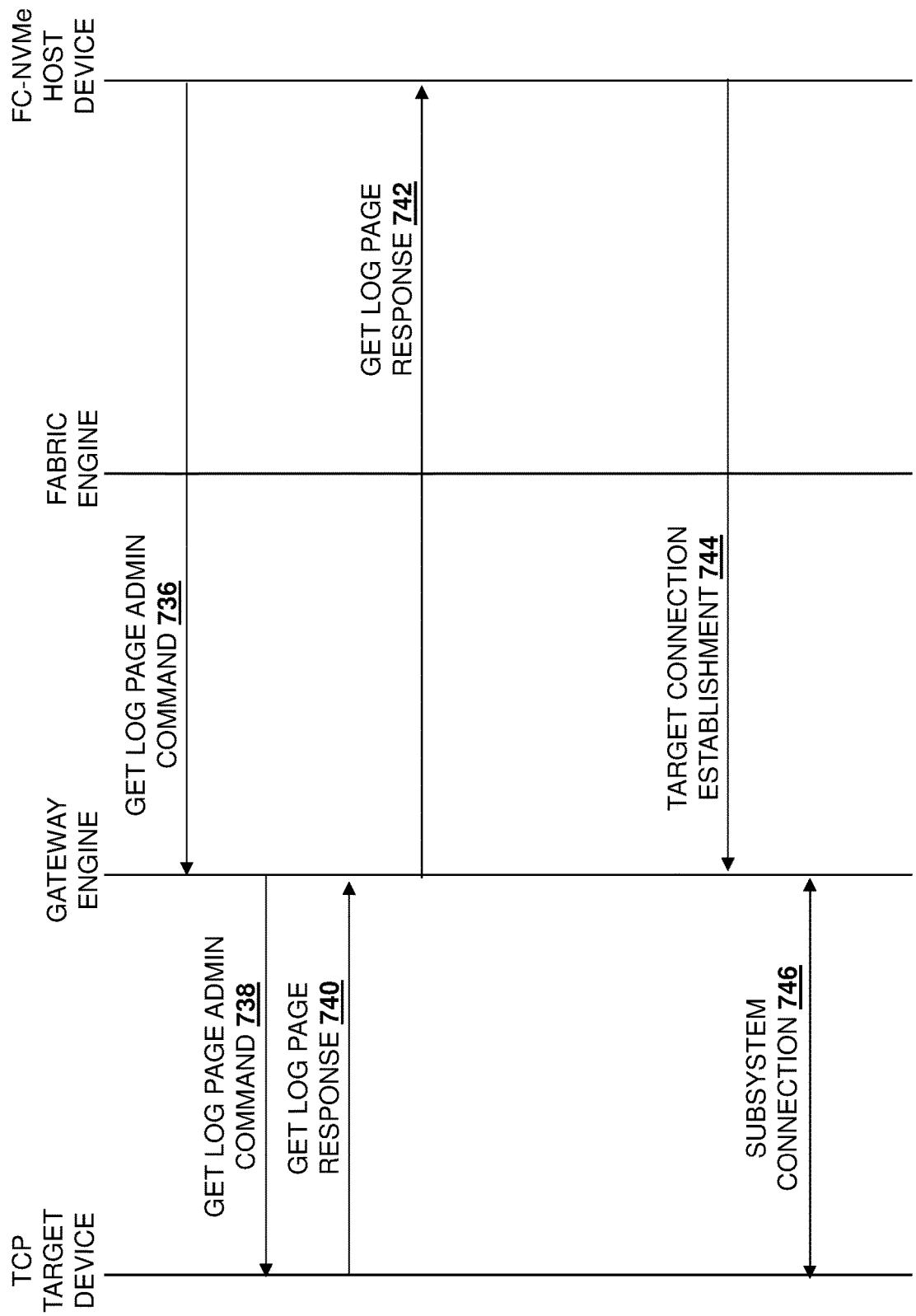
FIG. 7C is a swim-lane diagram illustrating an embodiment of operations performed by an NVMeof gateway system provided according to the teachings of the present disclosure.

Further still, FIG. 7C illustrates how the host device may transmit a get log page admin command communication 736 to the gateway engine in the networking device, the gateway engine may convert the get log page admin command communication 736 to a get log page admin command communication 738 and transmit the get log page admin command communication 738 to the target device, the target device may transmit an get log page response communication 740 to the gateway engine, the gateway engine may convert the get log page response communication 740 to a get log page response communication 724 and transmit the get log page response communication 742 to the host device, the host device may transmit a target connection establishment communication 744 to the gateway engine, and the gateway engine and the target device may exchange subsystem connection communications 746.

Similarly, FIGS. 8A-8C describe how a host device that is configured to use the NVMeoF(TCP) protocol and a target device that is configured to use the NVMeoF(FC) protocol may be connected in the NVMeoF gateway system using default zoning, which operates similarly as discussed above with reference to FIGS. 5A-5C but with a few differences that will be appreciated by one of skill in the art in possession of the present disclosure from the brief discussion below.

Figure 8A:
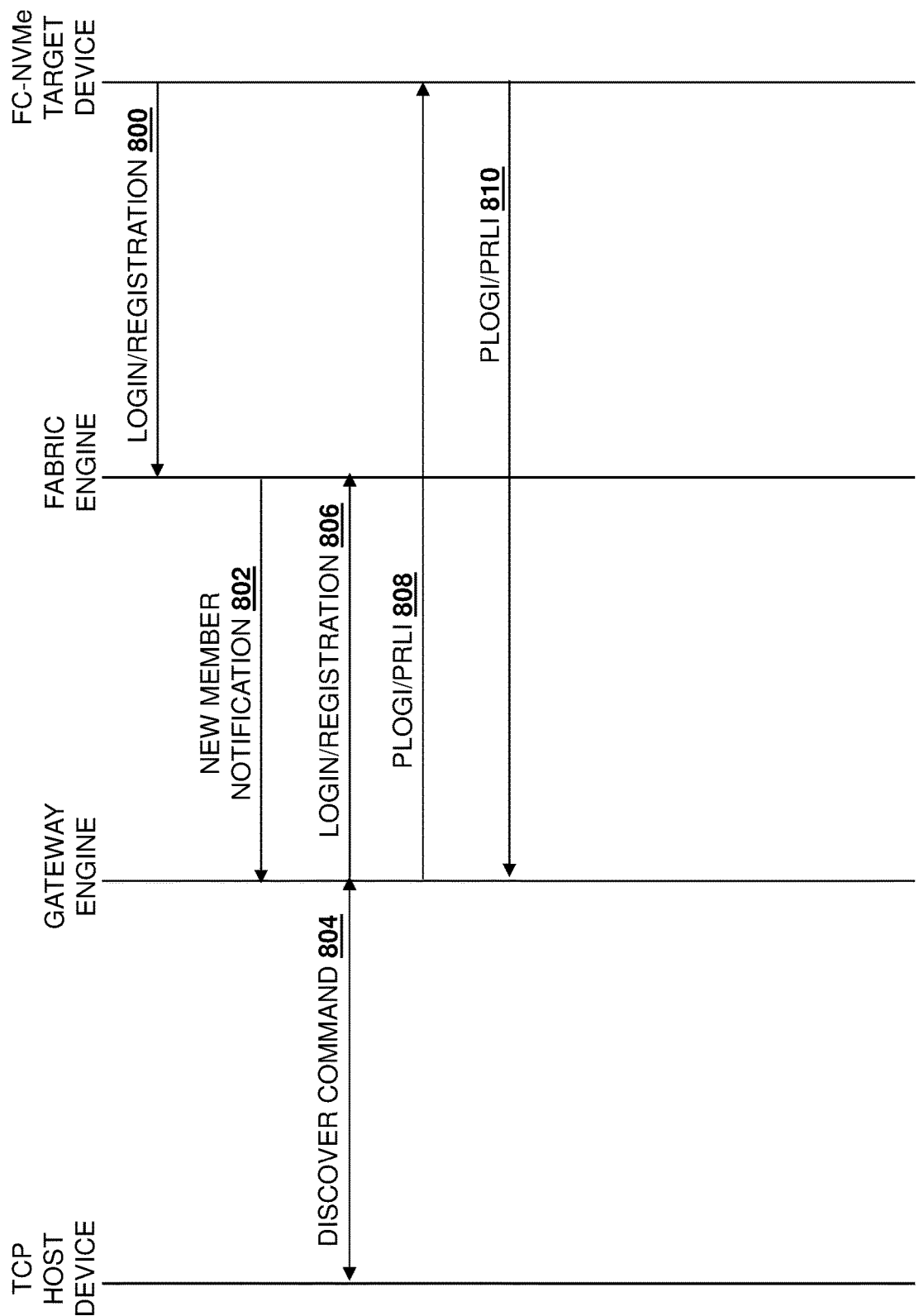
FIG. 8A is a swim-lane diagram illustrating an embodiment of operations performed by an NVMeof gateway system provided according to the teachings of the present disclosure.

For example, FIG. 8A illustrates how the target device may generate and transmit login/registration communications 800 (e.g., Fibre Channel fabric login and name server registration communications) to the fabric engine in the networking device, the fabric engine transmits a new member notification to the gateway engine in the networking device (which results in the generation of proxy target devices with proxy target address for all NVMe targets), the host device may exchange discover command communications 804 (NVMe discovery commands via a TCP connection established between the host device and a proxy target device generated for the target device) with the gateway engine, the gateway engine transmits login/registration communications 806 (e.g., Fibre Channel fabric login and name server registration communications) to the fabric engine, the gateway engine transmits PLOGI/PRLI communications 808 with the target device (e.g., from the proxy host device generated for the host device to discovery services associated with the target device), and the target device transmits PLOGI/PRLI communications 810 with the gateway engine.

Figure 8B:
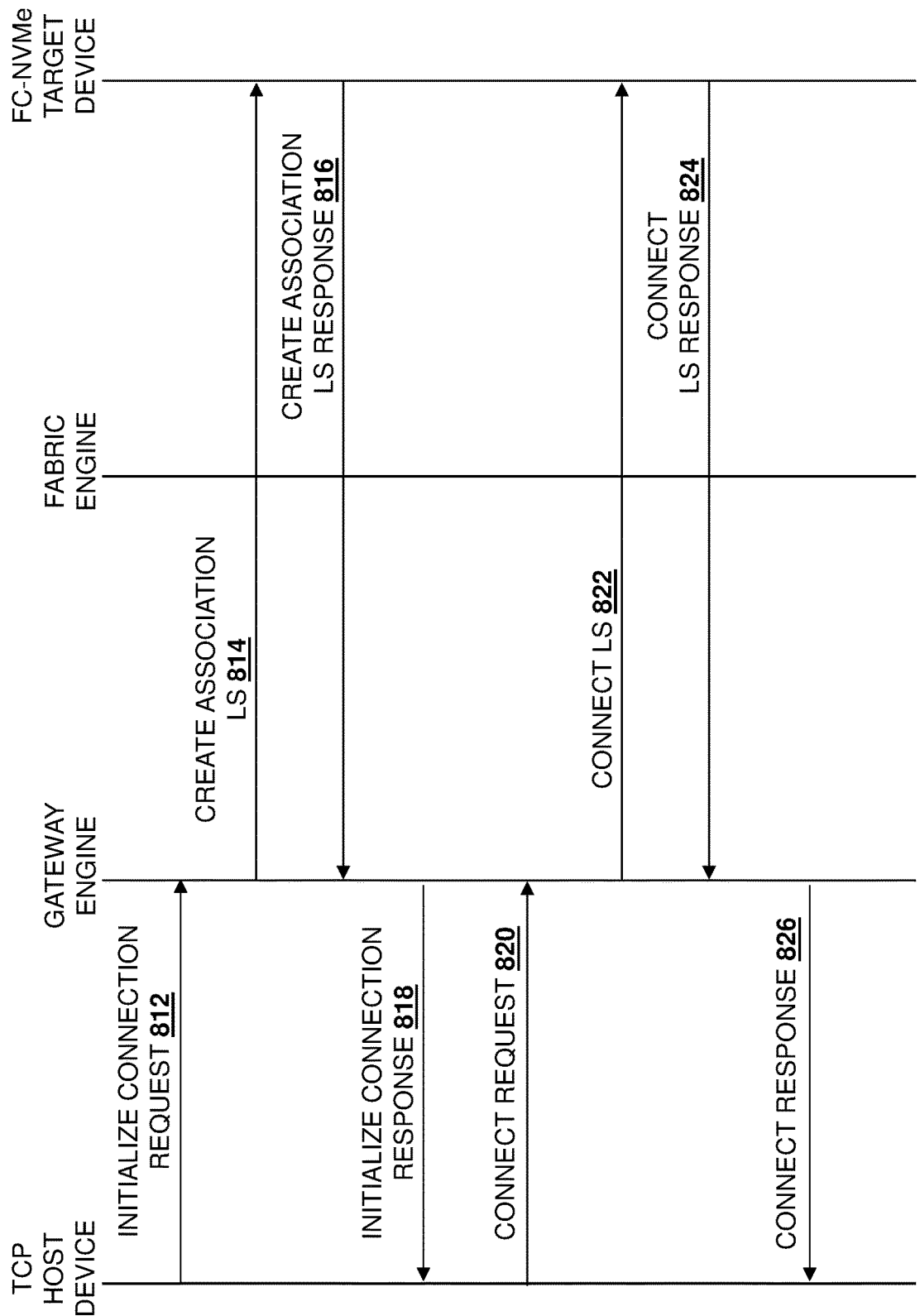
FIG. 8B is a swim-lane diagram illustrating an embodiment of operations performed by an NVMeof gateway system provided according to the teachings of the present disclosure.

Furthermore, FIG. 8B illustrates how the host device may transmit an initialize connection request communication 812 to the gateway engine in the networking device, the gateway engine may convert the initialize connection request communication 812 to a create association LS communication 814 and transmit the create association LS communication 814 to the target device, the target device may transmit a create association LS response communication 816 to the gateway engine, the gateway engine may convert the create association LS response communication 816 to an initialize connection response communication 818 and transmit the initialize connection response communication 818 to the host device, the host device may transmit a connect request communication 820 to the gateway engine, the gateway engine may convert the connect request communication 820 to a connect LS communication 822 and transmit the connect LS communication 822 to the target device, the target device may transmit a connect LS response communication 824 to the gateway engine in the networking device, the gateway engine may convert the connect LS response communication 824 to a connect response communication 826 and transmit the connect response communication 826 to the host device.

Figure 8C:
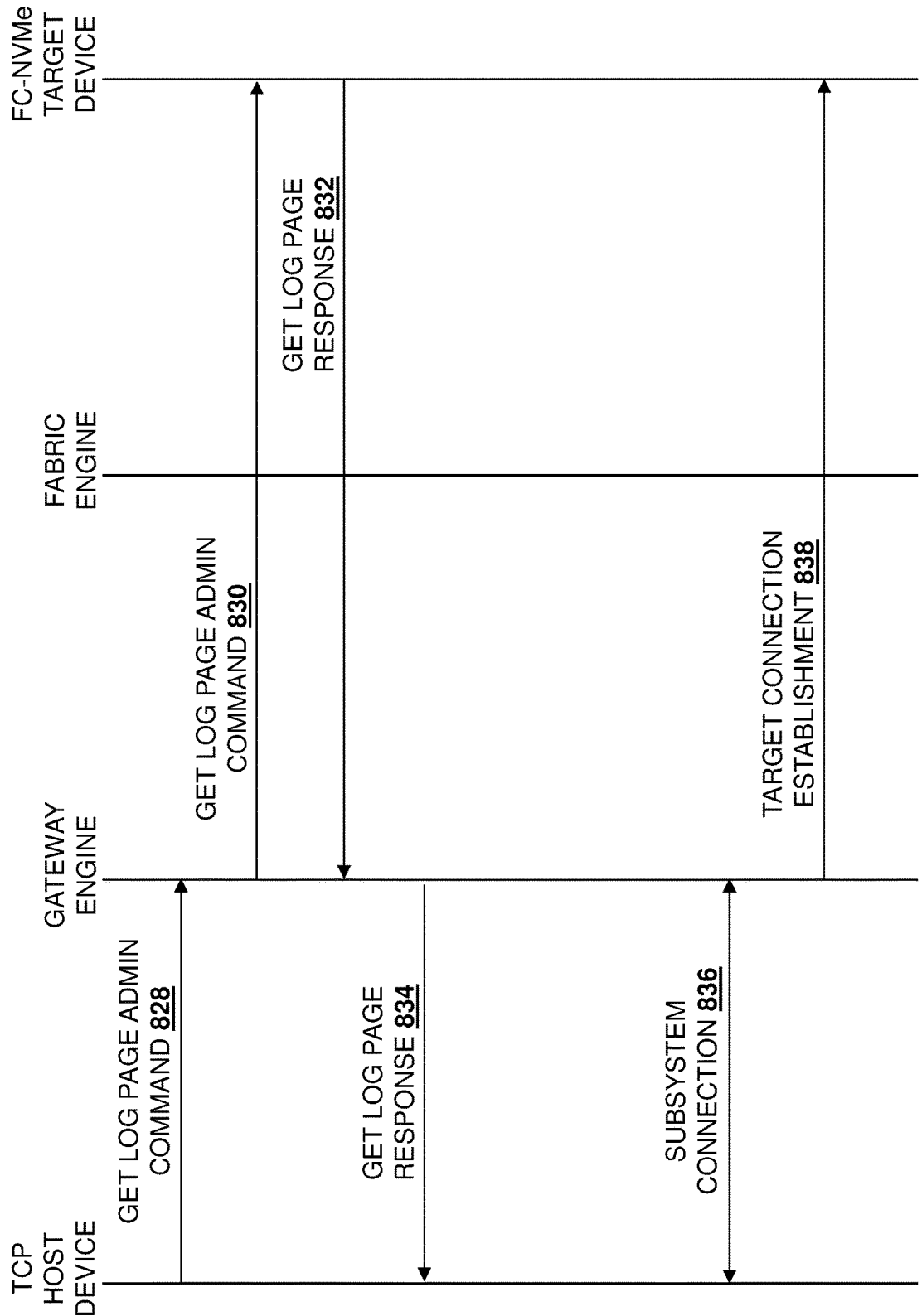
FIG. 8C is a swim-lane diagram illustrating an embodiment of operations performed by an NVMeof gateway system provided according to the teachings of the present disclosure.

Further still, FIG. 8C illustrates how the host device may transmit a get log page admin command communication 828 to the gateway engine in the networking device, the gateway engine may convert the get log page admin command communication 828 to a get log page admin command communication 830 and transmit the get log page admin command communication 830 to the target device, the target device may transmit a get log page response communication 832 to the gateway engine, the gateway engine may convert the get log page response communication 832 to a get log page response communication 834 and transmit the get log page response communication 834 to the host device, the host device and the gateway engine may exchange subsystem connection communications 836, and the gateway engine may transmit target connection establishment communications 746 to the target device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A Non-Volatile Memory express (NVMe) over Fabrics (NVMeoF) gateway system, comprising:
a physical host device that is configured to communicate using a host Non-Volatile Memory express (NVMe) over Fabrics (NVMeoF) protocol;
a physical target device that is configured to communicate using a target NVMeoF protocol that is different than host NVMeoF protocol; and
a networking device coupled to the physical host device and the physical target device, wherein the networking device is configured to:
generate a proxy target device for the physical target device that includes a proxy target address;
exchange, with the physical host device, discover command communications that identify the proxy target address to the physical host device;
establish, based on the discover command communications, a connection between the physical host device and the proxy target device;
generate a proxy host device for the physical host device;
receive, from the physical host device, the proxy target address;
perform, in response to receiving the proxy target address from the physical host device, zoning operations to create a zone that includes the proxy host device and the proxy target device;
convert first host NVMeoF protocol communications received from the physical host device to first target NVMeoF protocol communications by:
converting an initialize connection request to an NVMe create association Link Service (LS); and
converting a connect request to an NVMe connect LS;
provide the first target NVMeoF protocol communications to the physical target device using the proxy host device;
convert second target NVMeoF protocol communications received from the physical target device to second host NVMeoF protocol communications by:
converting an NVMe create association LS response to an initialize connection response; and
converting an NVMe connect LS response to a connect response; and
provide the second host NVMeoF protocol communications to the physical host device using the proxy target device,
wherein the first target NVMeoF protocol communications and the second host NVMeoF protocol communications configure the physical host device to store data on the physical target device and retrieve data from the physical target device.

2. The system of claim 1, wherein the host NVMeoF protocol is a Transmission Control Protocol (TCP)-based NVMeoF (NVMeoF(TCP)) protocol.

3. The system of claim 1, wherein the target NVMeoF protocol is a Fibre Channel (FC)-based NVMeoF (NVMeoF (FC)) protocol.

4. The system of claim 1, wherein the networking device is configured to generate the proxy host device and the proxy target device by:

receiving a fabric login/name server registration communication from the physical target device;
generating, in response to receiving the fabric login/name server registration communication, the proxy target address;
receiving, from the physical host device as part of the discover command communications, a discover command that identifies the target proxy address;
generating, in response to receiving the discover command, a host proxy World Wide Name (WWN) for the physical host device;
logging the host proxy WWN into a fabric that includes the physical target device; and
registering the host proxy WWN.

5. The system of claim 4, wherein the zoning operations include:
creating a Target Driven Zoning (TDZ) zone that includes the host proxy WWN as a principal and a target proxy WWN for the physical target device as a member.

6. The system of claim 1, wherein the first target NVMeoF protocol communications and the second host NVMeoF protocol communications operate to:
establish an administrative queue for the physical target device;
use the administrative queue to create a plurality of Input/Output (I/O) queues for the physical target device; and
perform read operations and write operations using the I/O queues for the physical target device.

7. An Information Handling System (IHS), comprising:
a processing system; and
a memory system that is coupled to the processing system and that includes instructions that, when executed by the processing system, cause the processing system to provide a gateway engine that is configured to:
generate a proxy target device for a physical target device that is coupled to the processing system, wherein the proxy target device includes a proxy target address;
exchange, with the physical host device, discover command communications that identify the proxy target address to the physical host device;
establish, based on the discover command communications, a connection between the physical host device and the proxy target device;
generate a proxy host device for the physical host device;
receive, from the physical host device, the proxy target address;
perform, in response to receiving the proxy target address from the physical host device, zoning operations to create a zone that includes the proxy host device and the proxy target device;
convert first host Non-Volatile Memory express (NVMe) over Fabrics (NVMeoF) protocol communications received from the physical host device to first target NVMeoF protocol communications by:
converting an initialize connection request to an NVMe create association Link Service (LS); and
converting a connect request to an NVMe connect LS;
provide the first target NVMeoF protocol communications to the physical target device using the proxy host device; and
convert second target NVMeoF protocol communications received from the physical target device to second host NVMeoF protocol communications by:

converting an NVMe create association LS response to an initialize connection response; and
converting an NVMe connect LS response to a connect response; and
provide the second host NVMeoF protocol communications to the physical host device using the proxy target device,
wherein the first target NVMeoF protocol communications and the second host NVMeoF protocol communications configure the physical host device to store data on the physical target device and retrieve data from the physical target device.

8. The IHS of claim 7, wherein the host NVMeoF protocol is a Transmission Control Protocol (TCP)-based NVMeoF (NVMeoF(TCP)) protocol.

9. The IHS of claim 7, wherein the target NVMeoF protocol is a Fibre Channel (FC)-based NVMeoF (NVMeoF (FC)) protocol.

10. The IHS of claim 7, wherein the memory system includes instructions that, when executed by the processing system, cause the processing system to provide a fabric engine, and wherein the gateway engine and the fabric engine are configured to generate the proxy host device and the proxy target device by:
receive a fabric login/name server registration communication from the physical target device;
generate, in response to receiving the fabric login/name server registration communication, the proxy target address;
receive, from the physical host device as part of the discover command communications, a discover command that identifies the target proxy address;
generate, in response to receiving the discover command, a host proxy World Wide Name (WWN) for the physical host device;
log the host proxy WWN into a fabric that includes the physical target device; and
register the host proxy WWN.

11. The IHS of claim 10, wherein the zoning operations include:
creating a Target Driven Zoning (TDZ) zone that includes the host proxy WWN as a principal and a target proxy WWN for the physical target device as a member.

12. The IHS of claim 7, wherein the physical target device is an NVMe storage device.

13. The IHS of claim 7, wherein the first target NVMeoF protocol communications and the second host NVMeoF protocol communications operate to:
establish an administrative queue for the physical target device;
use the administrative queue to create a plurality of Input/Output (I/O) queues for the physical target device; and
perform read operations and write operations using the I/O queues for the physical target device.

14. A method for providing an Non-Volatile Memory express (NVMe) over Fabrics (NVMeoF) gateway, comprising:
generating, by a networking device, a proxy target device for a physical target device that is coupled to the networking device, wherein the proxy target device includes a proxy target address;
exchanging, by the networking device with the physical host device, a discover command communications that identify the proxy target address to the physical host device;
establishing, by the networking device based on the discover command communications, a connection between the physical host device and the proxy target device;
generating, by the networking device, a proxy host device for the physical host device;
receiving, by the networking device from the physical host device, the proxy target address;
performing, by the networking device in response to receiving the proxy target address from the physical host device, zoning operations to create a zone that includes the proxy host device and the proxy target device;
converting, by the networking device, first host Non-Volatile Memory express (NVMe) over Fabrics (NVMeoF) protocol communications received from the physical host device to first target NVMeoF protocol communications by:
converting an initialize connection request to an NVMe create association Link Service (LS); and
converting a connect request to an NVMe connect LS;
providing the first target NVMeoF protocol communications to the physical target device using the proxy host device; and
converting, by the networking device, second target NVMeoF protocol communications received from the physical target device to second host NVMeoF protocol communications by:
converting an NVMe create association LS response to an initialize connection response; and
converting an NVMe connect LS response to a connect response; and
providing the second host NVMeoF protocol communications to the physical host device using the proxy target device,
wherein the first target NVMeoF protocol communications and the second host NVMeoF protocol communications configure the physical host device to store data on the physical target device and retrieve data from the physical target device.

15. The method of claim 14, wherein the host NVMeoF protocol is a Transmission Control Protocol (TCP)-based NVMeoF (NVMeoF(TCP)) protocol.

16. The method of claim 14, wherein the target NVMeoF protocol is a Fibre Channel (FC)-based NVMeoF (NVMeoF (FC)) protocol.

17. The method of claim 14, wherein the generating the proxy host device and the proxy target device includes:
receiving, by the networking device, a fabric login/name server registration communication from the physical target device;
generating, by the networking device in response to receiving the fabric login/name server registration communication, the proxy target address;
receiving, by the networking device from the physical host device as part of the discover command communications, a discover command that identifies the target proxy address;
generating, by the networking device in response to receiving the discover command, a host proxy World Wide Name (WWN) for the physical host device;
logging, by the networking device, the host proxy WWN into a fabric that includes the physical target device; and
registering, by the networking device, the host proxy WWN.

18. The method of claim 14, wherein the zoning operations include:
   creating, by the networking device, a Target Driven Zoning (TDZ) zone that includes the host proxy WWN as a principal and a target proxy WWN for the physical target device as a member.

19. The method of claim 14, wherein the physical target device is an NVMe storage device.

20. The method of claim 14, wherein the first target NVMeoF protocol communications and the second host NVMeoF protocol communications operate to:
   establish an administrative queue for the physical target device;
   use the administrative queue to create a plurality of Input/Output (I/O) queues for the physical target device; and
   perform read operations and write operations using the I/O queues for the physical target device.

\* \* \* \* \*